United States Patent [19]

Uffner et al.

[11] Patent Number: 4,537,921

[45] Date of Patent: * Aug. 27, 1985

[54] BLENDED PRESSURE-SENSITIVE ASPHALTIC BASED ADHESIVES

[75] Inventors: William E. Uffner, Newark; Robert N. White, Etna, both of Ohio; Edward R. Harrington, Naperville, Ill.

[73] Assignee: Owens-Corning Fiberglas Corporation, Toledo, Ohio

[ * ] Notice: The portion of the term of this patent subsequent to Apr. 13, 2001 has been disclaimed.

[21] Appl. No.: 575,248

[22] Filed: Jan. 30, 1984

Related U.S. Application Data

[62] Division of Ser. No. 407,394, Aug. 12, 1982, Pat. No. 4,478,962.

[51] Int. Cl.³ .............................. C09J 3/12; C09J 3/30; C09J 7/02
[52] U.S. Cl. ........................................ 524/59; 404/32; 428/349; 428/355; 428/489; 428/492; 428/521; 524/62; 524/68; 525/54.5; 525/99
[58] Field of Search ................. 428/40, 343, 492, 489, 428/392, 355, 521; 524/68, 519, 62, 59, 64, 511; 404/75, 32; 156/244.11; 523/438, 450; 525/54.5, 99; 106/235, 281 R, 273 R

[56] References Cited

U.S. PATENT DOCUMENTS

| | | | |
|---|---|---|---|
| 2,578,001 | 12/1951 | Cubberley et al. | 524/64 |
| 2,610,162 | 9/1952 | Hoffman | 524/511 |
| 2,884,400 | 4/1959 | Moore | 524/519 |
| 3,338,849 | 8/1967 | Johnson | 524/68 |
| 3,741,856 | 6/1973 | Hurst | 404/32 |
| 3,900,102 | 8/1975 | Hurst | 428/40 X |
| 3,919,148 | 11/1975 | Winters et al. | 524/62.59 |
| 3,932,341 | 1/1976 | Kutch et al. | 523/438 |
| 4,008,095 | 2/1977 | Fukushima et al. | 106/235 |
| 4,021,393 | 5/1977 | MacDonald | 106/273 R |
| 4,064,082 | 12/1977 | Henschel | 524/62 |
| 4,074,948 | 2/1978 | Heater | 404/75 |
| 4,113,799 | 9/1978 | Van Ornum | 525/99 |
| 4,169,822 | 10/1979 | Kutch et al. | 523/450 |
| 4,174,992 | 11/1979 | Fuji et al. | 156/244.11 |
| 4,175,978 | 12/1979 | Marzocchi et al. | 106/281 R |
| 4,217,259 | 8/1980 | Bresson | 524/68 |
| 4,273,685 | 6/1981 | Marzocchi et al. | 428/392 X |
| 4,394,482 | 7/1983 | Uffner | 525/54.5 |
| 4,440,816 | 4/1984 | Uffner | 428/40 |

Primary Examiner—Thomas J. Herbert
Attorney, Agent, or Firm—Ronald C. Hudgens; Robert F. Rywalski

[57] ABSTRACT

A pressure-sensitive adhesive is disclosed which is prepared by hot melt blending paving grade asphalt, a depolymerized virgin rubber, a terpene resin, and a vulcanizable, non-depolymerized styrene-butadiene copolymer. These adhesives are especially useful in forming membranes by coating one side of an asphaltic based coated reinforcement with these adhesives. They are useful for highway repair and maintenance purposes and for waterproofing and show good adhesion to cementitious, for example asphaltic concrete or Portland cement concrete, substrates.

2 Claims, No Drawings

BLENDED PRESSURE-SENSITIVE ASPHALTIC BASED ADHESIVES

This is a division, of application Serial No. 407,394, filed Aug. 12, 1982 now U.S. Pat. No. 4,478,962.

CROSS REFERENCES

The present application is related to co-pending applications U.S. Ser. Nos. 359,328 filed Mar. 11, 1982 and 360,729 filed Mar. 22, 1982 and now U.S. Pat. No. 4,440,816, both of which are hereby incorporated by reference.

TECHNICAL FIELD

The present invention relates to rubber modified asphalt compositions and, more specifically, rubber modified asphalt compositions which are pressure-sensitive adhesives. The present invention also relates to the formation of asphaltic membranes in the form of a laminate for use in highway repair and maintenance and for general waterproofing purposes.

BACKGROUND AND SUMMARY

Membranes are known which include a reinforcement having an asphaltic based coating thereon and including a pressure-sensitive adhesive on one side thereof. These membranes have utility for waterproofing purposes and for highway repair and maintenance purposes. U.S. Pat. Nos. 3,741,856 and 3,900,102 exemplifies such membranes. Such membranes are also commercially available under the trade designation Bituthene waterproofing membranes. It is believed that the pressure-sensitive adhesives employed in such membranes are admixtures of a rubber and an asphalt.

The above-incorporated co-pending applications also disclose such highway repair and maintenance membranes in the form of a laminate comprising a membrane of an asphaltic based composition coated fibrous reinforcement material and having an adhesive layer on one side thereof adapted to adhere to cementitious substrates, like Portland Cement and asphaltic cement. The asphaltic-based coating is a substantially non-tacky reaction product of asphalt, a polymerizable vinyl aromatic monomer, a non-depolymerized rubber, a terpene resin, and a depolymerized rubber, i.e., rubber which has been treated with a depolymerizing agent to decrease its molecular weight.

The present invention provides for asphaltic based, pressure-sensitive adhesives which may be employed in the above type indicated membranes or laminates, with the adhesive being prepared by hot melt blending a mixture consisting essentially of an AC-20 paving grade asphalt having a penetration of about 40 to about 65 and a viscosity of about 160,000 to about 240,000 cps at 140° F., a depolymerized virgin rubber, a terpene resin, and a vulcanizable, non-depolymerized styrene-butadiene copolymer. Relative to the preseure-sensitive adhesive described in the above-incorporated applications, the present adhesives are manufactured much more economically, that is, in shorter periods of time because the present adhesives are formed by simply hot melt blending the ingredients as opposed to performing a chemical reaction. Additionally, the formulations of the present invention eliminate one of the significant consitutents of the above-indicated pressure-sensitive adhesives which are prepared by a reaction and thereby also results in lower manufacturing costs.

DESCRIPTION

As indicated above, the present adhesives are prepared by blending the ingredients in a hot melt state to produce a homogeneous blend. Generally, the blending will be done at a temperature of in excess of about 300° F., and the blending will generally be for a period of time of less than about 5 or 6 hours depending on the degree of agitation employed in blending the materials. Typically, the adhesives are prepared by blending the materials at a temperature of about 340° F. about 4 hours.

As the non-depolymerized rubber, or elastomeric polymer, use can be made of a number of commercially available elastomeric materials which are copolymers of butadiene and styrene. Generally, the moiety of styrene and butadiene in the copolymer is not critical, but it is usually preferred to employ a copolymer in which the butadiene moiety is in a major amount and a styrene moiety in a minor amount. Preferred copolymers will have a butadiene moiety of in excess of about 65% and a styrene moiety of less than about 35%. A commercially available, suitable material is that sold under the trade designation Solprene 1205-C copolymer having a butadiene moiety of about 70%. The non-depolymerized styrene-butadiene rubber copolymer, in addition to conrolling viscosity and tackiness, e.g., the ability to stick to cementitious substrates, also provides body, or firmness, to the composition. That is, the styrene-butadiene copolymer provides the composition with desirable resistance to cold flow in that when the composition is used to provide a laminate of the type described above with beads or strips of the adhesive composition, the beads generally retain their shape at ambient conditions and will not flow substantially of their own weight. Thus, this copolymer is generally present in effective cold flow resisting amounts.

Depolymerized virgin rubber generally refers to a natural or synthetic rubber which has not been previously vulcanized but which has been depolymerized to decrease its molecular weight by treatment with a depolymerizing agent, for example, with an alkali. Thus, it generally includes virgin, or unvulcanized, natural rubber which has been so treated to decrease its molecular weight and to synthetic rubbers which are virgin, i.e., unvulcanized, which have similarly been treated to decrease their molecular weight. It particularly includes, for example, depolymerized synthetic conjugated diene polymers, such as depolymerized synthetic polyisoprene, depolymerized synthetic polybutadiene and depolymerized polychloroprene. Generally, the depolymerized rubbers employed in the practice of this invention have average molecular weight ranging from about 10,000 to 110,000 and, desirably, about 30,000 to about 80,000. Various depolymerized rubbers are available from Hardman Inc. under the trademark "Isolene", a series of liquid depolymerized virgin synthetic polyisoprene polymers, and "DPR", a series of liquid depolymerized virgin, or unvulcanized, natural rubbers. Chemically, such polymers essentially are cis-1,4-polyisoprene having low molecular weights and Brookfield (RVT) viscosities ranging from about 30,000 to about 50,000 cps at 100° F. (38° C.). Especially preferred are those having viscosities of about 300,000 to 500,000 cps at 100° F. (38° C.) like DPR-400 rubber from Hardman Inc. The depolymerized virgin rubber is present in the adhesive compositions in effective tacky amounts. That is, the depolymerized virgin rubber provides the composition with quick tackiness, especially at temperature of about 40° F., in that the composition substantially instantaneously upon contact tenaciously sticks to cementitious substrates like concrete.

As the terpene resin, use can be made of a number of synthetic polyterpene resins commercially available. One such resin is marketed by Goodyear Chemicals under the trademark "Wingtack", including the Wingtack 95 resin, which is a synthetic polyterpene derived from $C_5$ hydrocarbon resins. Another Wingtack resin useful in the practice of this invention is Wingtack 115, a resin commercially similar to Wingtack 95 resin, except that Wingtack 115 resin has been polymerized to a higher softening point. Other suitable terpene resin are those resins manufactured by Hercules under the trademark "Piccolite" resins, including the A-100, A-115, A-125 and A-135 resins. Those resins are all derived from the monomer alpha-pinene. They have melt viscosities ranging from about 185 to about 220° C. at 1 poise. A preferred commercially available terpene resin in Nevpene 9500 available from Nevelle Chemical Company. The terpene resin, in addition to providing quick tackiness to the composition, serves to give the adhesive composition a lower viscosity at lower temperatures so that the composition can be employed, for example in forming road repair laminates, at lower temperatures. Thus, the terpene resin is present in effective viscosity depressing amounts.

As indicated previously, one of the uses for the present adhesive is in forming laminates or membrane for use in waterproofing and in the repair and maintenance of vehicular supporting structures, such as, for example, in the repair and maintenance of highways, roads, driveways, parking lots, airport runways and the like. Such laminates are prepared by coating a reinforcement material, preferably a fibrous reinforcement material, with an asphaltic composition which is substantially non-tacky, that is, composition which is not substantially a pressure-sensitive adhesive, to form a coated reinforcement membrane. One side of that membrane is then strip coated with the pressure-sensitive adhesive compositions of this invention. Preferred asphaltic composition for use as the non-tacky coating is the reaction product of asphalt, a vinyl aromatic monomer, and a rubber. For further particulars as to this substantially non-tacky asphaltic composition, reference may be had to the aforementioned incorporated applications. Another suitable non-tacky asphaltic composition is that described in co-pending application U.S. Ser. No. 407,390 filed on Aug. 12, 1982. In forming such laminates for the uses indicated above, it is preferred to protect the adhesive layer of the laminates, and prevent interlaminate adherence, e.g., when in a rolled up form prior to time of use by covering the adhesive with a suitable removable, or releasable, skin in the form of a releasable paper. Additionally, if desired, the apshaltic coating forming the substantially non-tacky portion of the laminate may be dusted lightly with, for example, limestone or talc to further prevent adhesion when in rolled up form. Exemplary fibrous reinforcement materials are various mats, including chopped strand mats, continuous strand mats, swirl mats, woven and non-woven fabrics, for example, woven rovings, insect screening, scrim and the like. Preferably, the fibrous materials are glass, but they may also be organic polymeric materials or combinations of glass and organic polymers. The preferred reinforcement is a woven glass roving.

Formulations of ingredients which interact to produce adhesive compositions having the best needed properties will generally consist essentially of about 60% to about 8% (weight) of a non-depolymerized styrene-butadiene copolymer, preferably about 6.9 to about 7.8%, about 8% to about 12%, preferably about 8.9 to about 11.2% of depolymerized virgin rubber, about 18% to about 24% and, preferably, about 18.5 to about 24% of terpene resin with the paying grade asphalt being in an amount of about 56% to about 68% and preferably about 57% to about 65.7%. The best compositions have viscosities of about 7800 cps to about 9200 cps at 250° F.

While the foregoing describes the present invention with sufficient particularity to enable those skilled in the art to make and use same, nonetheless, there follows a non-limiting example thereof.

EXAMPLE

A pressure-sensitive asphaltic based adhesive was prepared by hot melt blending a batch of about 680 parts by weight of AC-20 paving grade asphalt, about 110 parts by weight of DPR-400 depolymerized natural rubber, about 80 parts by weight of Solprene 1205C styrene-butadiene copolymer, and about 240 parts by weight of Nevpene 9500 terpene resin. These ingredients were combined with agitation by heating at a temperature of about 340° F. for 4 hours, after which time the adhesives were employed to form laminates suitable for use in waterproofing applications and in the repair and maintenance of vehicular supporting surface. Thus, a suitable reinforcement, for example a woven roving, was first coated with a non-tacky asphalt coating, such as those indicated above, and then to one side of that membrane was applied, by a hot melt application technique, strips of the pressure-sensitive adhesives formed above in the form of a bead. These laminates showed good bonding and peel strengths when applied to cementitous substrates, namely Portland cement concrete substrates and asphaltic concrete substrates.

The beads showed substantially no cold flow. They also showed substantially instantaneous sticking when applied to concrete while both were at a temperature of 40° F.

While the above described the present invention, it will, of course, be apparent that modifications are possible which, pursuant to the patent statutes and laws, do not depart from the spirit and scope thereof.

We claim:

1. A hot melt blended pressure sensitive adhesive having substantially no cold flow and the ability to stick to cementitious substrates substantially instantaneously upon contact at 40° F., said adhesive consisting essentially of a paving grade asphalt, effective tacky amounts of a depolymerized virgin rubber having a molecular weight from about 10,000 to 110,000, effective viscosity depressing amounts of a terpene resin, and effective cold flow resisting amounts of a non-depolymerized styrene-butadiene copolymer.

2. The adhesive of claim 1 wherein said depolymerized rubber is present in an amount of about 8% to about 12% by weight, said terpene in an amount of about 18% to about 24% said copolymer in an amount of about 6% to about 8%, and said asphalt in an amount of about 56% to about 68%, said said adhesive having a viscosity at 250° F. of about 7800 cps to about 9200 cps.

* * * * *